United States Patent [19]

Hill

[11] Patent Number: 4,838,941
[45] Date of Patent: Jun. 13, 1989

[54] MAGNESIUM CEMENT

[75] Inventor: Robert G. D. Hill, Hendon, Australia

[73] Assignee: Ausmintec Corp. Limited, Hendon, Australia

[21] Appl. No.: 599

[22] Filed: Jan. 6, 1987

[30] Foreign Application Priority Data

Jan. 7, 1986 [AU] Australia .............................. PH4143

[51] Int. Cl.⁴ ............................ C04B 9/02; C04B 9/04
[52] U.S. Cl. ................................... 106/106; 106/105; 423/163; 423/178; 423/472; 423/473
[58] Field of Search ................. 106/105, 106; 423/163, 423/178, 472, 473

[56] References Cited

U.S. PATENT DOCUMENTS

| | | | |
|---|---|---|---|
| 2,526,837 | 10/1950 | Woodward | 106/106 |
| 2,703,273 | 3/1955 | Robertson et al. | 106/106 |

FOREIGN PATENT DOCUMENTS

| | | | |
|---|---|---|---|
| 520027 | 12/1955 | Canada | 106/106 |
| 348503 | 9/1972 | U.S.S.R. | 423/472 |
| 17208 | 7/1895 | United Kingdom | 106/106 |

*Primary Examiner*—Mark L. Bell
*Attorney, Agent, or Firm*—Klauber & Jackson

[57] ABSTRACT

A reaction product of at least one of magnesium carbonate and magnesium silicate, with a metal chloride at a temperature exceeding 300° C. Such a product, when mixed with water, sets to be an immensely strong magnesium cement. It may have aggregates of various types mixed with it.

18 Claims, 2 Drawing Sheets

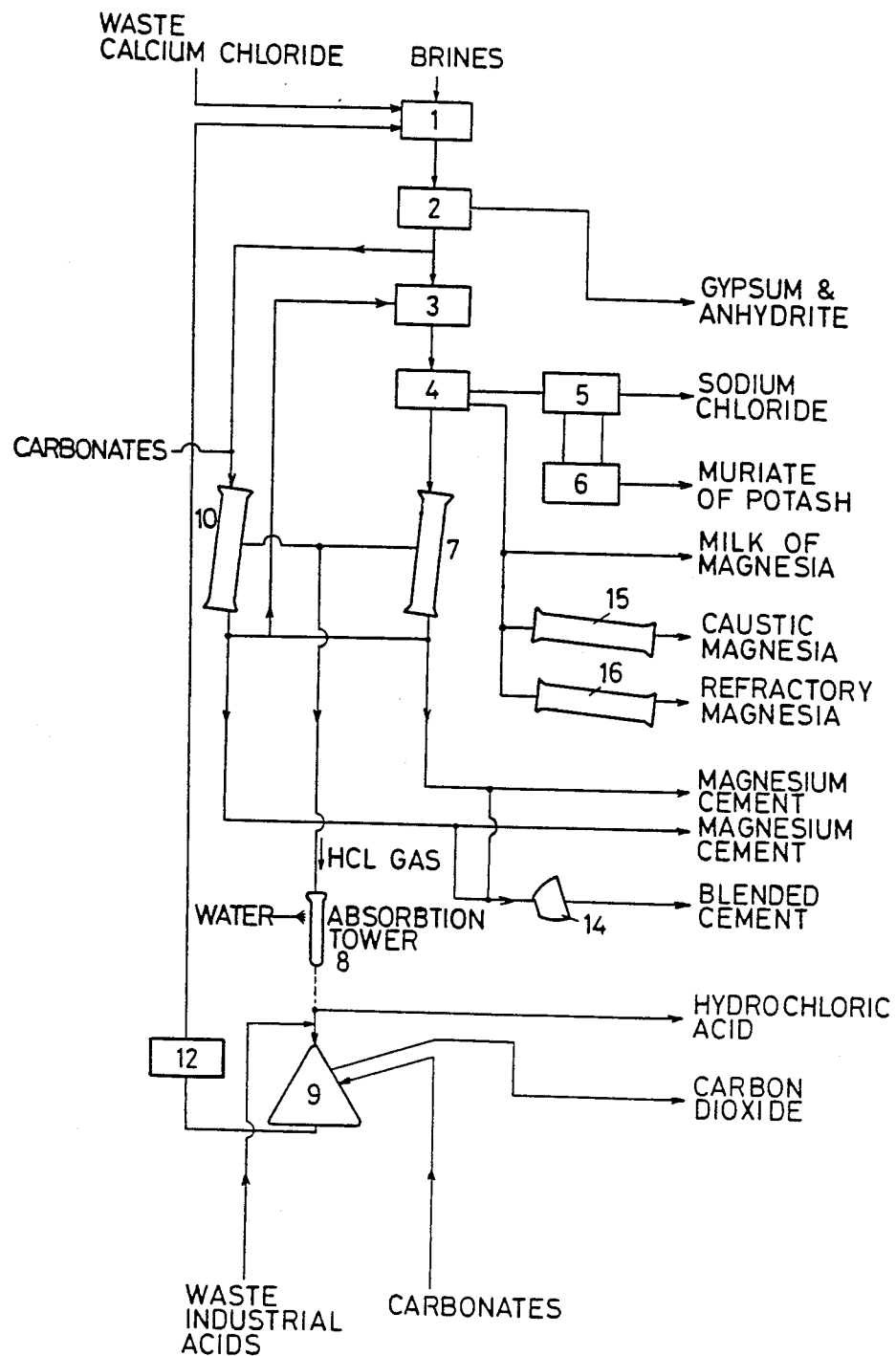
FIG. I

TABLE

| VARIABLE FACTOR | CONSEQUENCES | BENEFITS | HAZARDS |
|---|---|---|---|
| CARBONATES HIGH IN CALCIUM & LOW IN MAGNESIUM | UNCHANGED CaCO₃ AT LOW KILN TEMPERATURES<br>FORMATION OF EXCESS CaO at HIGH TEMPERATURES | REDUCED CORROSION HAZARDS | HIGH LEVELS DILUTE CEMENT STRENGTH<br>REQUIRES MORE BRINE INPUT |
| CARBONATES LOW IN CALCIUM & HIGH IN MAGNESIUM | MINIMUM FORMATION OF CaO | STRONG CEMENTS REDUCED BRINE NEEDS | NIL |
| BRINES HIGH IN MAGNESIUM CHLORIDE OR SULPHATE | HIGH PRODUCTION IN KILN 10 | EFFICIENT PRODUCTION OF STRONG CEMENTS | BLENDING OF CEMENTS DESIRED TO REDUCE STEEL CORROSION |
| BRINES HIGH IN ALKALI CARBONATES | INCREASE IN ALKALI SILICATES at high temperatures | IMPROVED STRENGTH NIL CORROSION | SLOWER DEVELOPMENT OF MAXIMUM STRENGTH |
| INCREASED SILICATE INPUT | UNIQUE BONDING MECHANISM DEVELOPS | IMPROVED IMPACT STRENGTH & EASY MACHINING | DILUTION OF CEMENT STRENGTH AT HIGH LEVELS |
| PHOSPHATES, FLUORIDES & BORATES IN CARBONATE MINERALS OR BRINES | FORMATION OF FLUORPHOSPHATES, PHOSPHATES AND BORATES OF MAGNESIUM | STRONGER DENSER CONCRETES WITH RESISTANCE TO ACIDS & ALKALIS | NIL |
| LOW OPERATING TEMPERATURE KILN 10 | REDUCED CaO & ALKALI SILICATE FORMATION | REDUCED FUEL CONSUMPTION | DILUTION OF CEMENT BY LIMESTONE |
| HIGH OPERATING TEMPERATURES IN KILN 10 | INCREASED FORMATION OF CaO and INCREASED ALKALI SILICATE FORMATION | INCREASED KILN 7 PRODUCTION AND STRONG CEMENTS | VERY MINOR INCREASE IN SHRINKAGE ON SETTING |

FIG. 2

MAGNESIUM CEMENT

This invention relates primarily to a product which, by addition of water, sets to a magnesium cement having superior strength characteristics. In some embodiments of the invention, the invention is directed to a method of production of magnesium cement, and also to the means of production.

BACKGROUND OF THE INVENTION

The cement in most common use is Portland cement, which is made by finely grinding limestone and clay or shale and calcining with some added gypsum, to temperatures approaching or in excess of 1600 degrees centigrade. The mixture after calcining is known as clinker and requires further fine grinding, and frequently the addition of gypsum, to produce Portland cement. In some locations volcanic rocks can be substituted for the clay and shale.

Portland cement when mixed with water and aggregates sets to a concrete which, according to ASTM (Australian Standard) requirements, should achieve a compressive strength of 3000 psi or 20 mPa after 28 days. To achieve maximum mechanical strength, the amount of water used in the mixing must be kept to a minimum, and the casting of concrete made with Portland cement is consequently difficult if high mechanical strength is required. Surface treatment of cast concrete is also usually necessary to improve appearance.

Portland cement is presently produced in very large quantities, but, because of the need to finely grind the materials both before and after calcining, and because of the cost of achieving the high calcining temperatures, and the cost component for energy requirements, the cost is very high (by comparison with this invention). For example, in South Australia, the energy cost is about six times the cost of the basic materials.

An object of the invention is to provide a cement which can be produced without the need to finely grind the natural limestone and shale raw materials, or the calcined clinker, and without the need to attain high calcining temperatures, and yet be able to make use of readily available and inexpensive basic materials.

Various types of magnesium cement are already known, the most relevant to this invention being Sorel cement. In the production of Sorel cement, high grade magnesite or magnesium carbonate is calcined to form reactive magnesium oxide (MgO). If the calcining temperature is raised to 1500° C. or higher, a non reactive product called deadburned magnesia is obtained. This product finds application in blast furnaces and in refractory applications. It lacks mechanical strength, however, and is not used where significant mechanical strength is required. It is not used in Sorel cement.

If on the other hand temperatures of calcining are reduced to not less than 750° C., (and quite commonly 900° C.) reactive or caustic magnesia is produced. This material has a useful mechanical strength, although when maintained in a moist condition for long periods of time, it very slowly converts to basic magnesium carbonate. This reaction is much slower than the corresponding reaction involving quick lime or hydrated lime, and many years are required to achieve a stable mechanical strength.

Caustic magnesium oxide produced by calcining magnesite at temperatures between 750° C. and 1500° C. will, however, react at ambient temperature with moderately concentrated solutions of magnesium chloride to produce Sorel cement. Sorel cement made in this manner is frequently erroneously referred to as magnesium oxychloride cement. Magnesium sulphate has been substituted for magnesium chloride to produce cements of lesser mechanical strength and severe shrinkage characteristics which have been erroneously referred to as magnesium oxysulphate cements.

The term magnesium oxychloride implies a formula Mg—O—Cl. Since these products produce hydrogen chloride on heating in a dry atmosphere, this formula is obviously incorrect. Consequently some writers have given the so-called magnesium oxychloride components the formula MgO—HCl.

This formula is completely at variance with chemical analysis of "sorel" cements, which have been given formulae as below by various authorities.

All reliable analyses of these "oxychloride" cements agree on some or all of the following empirical formulas being acceptable.

| Formula | Ratio Mg:Cl | Mg Content | Ratio Mg:OH |
| --- | --- | --- | --- |
| 2 Mg (OH)$_2$ Mg Cl$_2$ 4 H$_2$O | 1.0 | Mg = 25% | 0.52 |
| 3 Mg (OH)$_2$ Mg Cl$_2$ 8 H$_2$O | 1.35 | Mg = 23% | 0.40 |
| 5 Mg (OH)$_2$ Mg Cl$_2$ 8 H$_2$O | 2.0 | Mg = 27% | 0.47 |
| 9 Mg (OH)$_2$ Mg Cl$_2$ 5 H$_2$O | 3.38 | Mg = 34% | 0.61 |

All these products result from an interaction of reactive magnesium oxide with magnesium chloride in aqueous solution, at temperatures between 0° C. and 100° C.

Numerous other authorities still accept the 2, 3, 5 or 9 compounds as separate compounds with H$_2$O content varying significantly with the conditions of formation.

All sorel or magnesium oxychloride cements referred to in the literature comply approximately with the formulae given above and all decompose on heating to about 600 degrees C., evolving hydrochloric acid and leaving a residue of magnesium oxide. They are not resistant to continuous immersion in water, and, having a pH of between 4.8 and 5.2, are corrosive to steel.

Another commonly used cement is formed by calcining limestone minerals with high magnesium content, also at very high temperature, along with clays and shales, to produce a product similar to Portland cement.

OTHER PRIOR ART

In addition to the Portland and magnesium cements referred to above, reference can be made to the following patent literature:

U.S. Pat. No. 4,003,752, Isohata et al, utilising active magnesia (MgO), magnesium sulphate (MgSO$_4$) and pulp. One object of this invention therein is to reduce the sulphur content as much as possible, since, in the cement of this invention, it will increase shrinkage and reduce desirable strength characteristics.

P.C.T. WO85/04860, Delphic Research, relates to a paint-like slurry which uses an "oxychloride" cement with high alumina mono calcium aluminate cement and colloidal silica. That invention seeks to reduce to a minimum the oxychloride (Sorel) cement content because it reduces desirable strength characteristics. The other constituents are not used in any admixture.

U.S. Pat. No. 3,778,304, Thompson. Relates to an oxychloride cement containing a frothing agent and, (as said), is avoided in the invention herein.

U.S. Pat. No. 4,419,196, Beckerick. Relates to abrupt hardening of oxychloride cement.

U.S. Pat. No. 4,339,278, Duyster. Relates to Sorel (oxychloride) cement.

U.S. Pat. No. 4,352,694, Smith-Johannsen. Relates to oxychloride cement.

P.C.T. WO85/00586, Shubow. Relates to mixture of magnesium oxide, silicate, aggregate and mono-aluminium-phosphate acidic solution. Although phosphates can be tolerated, they are not necessary in the invention herein.

The above references constitute the closest art known to the Applicant, but all relate to Sorel cement (in one form or another).

No prior art at all is known to the Applicant relating to a reaction product of magnesium containing mineral and a metal chloride at a temperature of between 300° C. and 1000° C. Such a product contains little or no water, and is almost completely anhydrous.

Furthermore, there is no art known to the Applicant wherein a magnesium carbonate or silicate is reacted with a metal chloride and water at sufficient temperature exceeding 300° C. to release HCl and produce reactive magnesium oxide in combination with other magnesium compounds (particularly carbonates or silicates).

BRIEF SUMMARY OF THE INVENTION

A product according to this invention is a reaction product of at least one of magnesium carbonate and magnesium silicate, with a metal chloride at a temperature exceeding 300° C. Such a product, when mixed with water, sets to be an immensely strong magnesium cement. It may have aggregates of various types mixed with it.

Seeding of a crystal sometimes causes crystal growth to continue in a generally similar manner to the seeding crystal, even though the normal structure of the predominant crystal forming chemical is of a different configuration. This invention makes use of this phenomenon, and if some of the seeding is effected with, for example, chlor-oxy-magnesium compounds, or with other products having suitable covalent bondings (silicates or carbonates), a component of the final set mass will comprise interlocking crystals of desirable configurations. In many instances these will predominate, and prevent the formation of the less desirable hydroxide nuclei.

In an embodiment of this invention, the crystals of the cement (after mixing with water) are composite, and not a mere mass of separate or interpenetrating crystals. This will particularly apply if some at least of the particualte materials are simultaneously formed in a series of simultaneously occurring inter-related chemical reactions, since such simultaneous formation promotes a unique crystal seeding mechanism, which greatly assists the formation of the composite crystal structure. This composite structure is partly responsible for extraordinary proerpties, and is difficult to achieve without such simultaneous formation.

Thus, in an embodiment of the invention, a method of production of magnesium cemetn comprises reacting magnesium containing mineral, specifically at least one of magnesium carbonate or magnesium silicate, with a metal chloride and water, at a temperature exceeding 300° C. to release hydrogen chloride, and thereby in turn produce reactive magnesium oxide in combination with other compounds.

The invention may further:

(a) react other of that hydrogen chloride with magnesium carbonate or silicate to form further $MgCl_2$ (b) form chlor-oxy-hydroxy compounds of magnesium ($MgO_x.Mg(OH)_{2y}.MgCl_{2z}$) where x, y and z are integers ranging between 1 and 12, before further reaction at a temperature exceeding 300° C.

In some instances, the entire output of the reaction is useful as magnesium cement, without the need to separately form the Mg.O, MgO-[MCl] and ($Mg.O_x.Mg(OH)_{2y}.MgCL_{2z}$) from the other reaction products, or chemicals which are present but are not reaction products.

In other instances, where the raw material input includes larger alkali metal carbonate components, and smaller chloride components, a very valuable magnesium cement can be produced with a smaller amount of chloroxy-magnesium compound, for example a cement containing up to 35% by weight of [$MCO_3$], but the production method remains generally as above defined, the only variants being the infeeds and products of reaction.

A magnesium cement product in one embodiment of this invention is produced from brines and/or carbonate or silicate minerals, but the invention also extends to the production of certain by-products, which can include sodium chloride, potassium chloride, milk of magnesia, caustic magnesia, refractory magnesia, hydrochloric acid and carbon dioxide.

In another aspect the invention is directed to a treatment of brines whereby all or at least some of the above by-product and magnesium cement are produced.

In one of the simplest applications of the invention, particulate dolomite or magnesite, (preferably finely ground), are heated with bitterns from sea water of specific Gravity 1.28 to 1.32: to a temperature in the range 550 degrees C.–650 degrees C. in a kiln. This simple process produces a hard anhydrous mass, which, after further grinding, will react with either water or with magnesium chloride solution to from a strong cement. A unique feature of this cement is that the hard mass formed will remain stable until heated to temperatures of 1000 degrees C., with no significant evolution of hydrogen chloride until temperatures in excess of 1000 degrees C. are attained. If this hard mass is analysed before mixing with water, the molecular weight ratio of magnesium to chlorine will normally exceed 3.6, and usually lie in the range of 4.4 to 4.5, corresponding approximately to a formula 12 Mg $(OH)_2$ Mg $CL_2$ this compound is dissimilar to the sorel cements or so called "magnesium oxychloride" compounds referred to in the literature, not only because of the increased Mg:Cl ratio, but also because it is generally anhydrous.

A similar strong cement can be produced by reacting magnesium oxide (prepared by calcining magnesites, dolomites or chlor-oxy-hydroxy magnesium compounds) with large excesses of magnesium chloride rich brines, and further calcining the reactive chlor-oxy-hydroxy compounds of magnesium so formed, to form a product in which the ratio of Mg:Cl exceeds 3.4. In this case the cement will have significantly smaller particle size than cement produced from calcined ground dolomite plus bitterns, and very strong cement will be produced if the two cements are blended, due to closer compaction of the particles.

In further improvements on cements made in this simple manner, the strength of the cement can be further improved and desirable attributes increased by allowing remnant reactive magnesia to further react with carbonates, silicates, borates, phosphates, alumino silicates and fluorides. When two or more of these groupings are present after the addition of water, but prior to the setting of the cement, available space between the linked magnesium atoms will be occupied jointly by combinations of these groupings to give hard dense compact cements.

In this specification the word "silicates" is used to describe the magnesium and aluminium silicate minerals including talcs, kaolins, shales and clays which may be incorporated into the cement products of this invention.

In this specification the work "carbonates" is used to describe the limestones, dolomites, magnesites, tronas, marls, natrons and similar pure and impure sources of the carbonates of calcium, magnesium, potassium and sodium, including alkaline solutions obtained from natural carbonate minerals deposits.

Bitterns are the concentrated saline solutions remaining after the evaporation of the major water content and the extraction of the bulk of the common salt content of sea water. Since bitterns are readily available in many situations in considerable quantities, and are normally discarded in the extraction of common salt from sea water, the following description relates principally to the use of bitterns. However many saline waters can be used with changes in the relative quantities of the reagents. In general principle, the words "brines" and "bitterns" can be used interchangeably.

In this specification the word "brines" is therefore used to include bitterns, ground waters, the water of salt lakes, evaporite minerals (particularly those claimed by solution mining) sea water, reject water from saline water treatment plants and other sources which are readily available. Such products usually contain a variety of cations and anions, and another object of the inventionis to produce valuable by-products by reaction with such brines in a series of reactor tanks or ponds so that magnesium, calcium and sulphur compounds are separately recovered.

The most convenient raw materials for the manufacture of magnesium cement are brines or bitterns and carbonates in the form of dolomites (or calcareous dolomites or magnesium limestones). Heat energy is also required, and this can be supplied from conventional solid, liquid or gaseous fossil fuels, or from electrical energy. A feature of this invention is that heat input is significantly less than that required for Portland cement, and the cement produced using this invention requires heating to relatively low temperatures in the manufacturing process. This feature results in substantial savings in fuel costs and the cost of plant installation and maintenance.

Other raw materials which are not necessary for the purposes of this invention but which can be used in the process according to local availabilities and which enhance desirable qualities in the magnesium cement, or alternatively enable complete utilization of the raw materials with no waste by-products whatsoever include minerals found in common evaporite sequences including the chlorides, sulphates and carbonates of magnesium, potassium, calcium and sodium, and including epsomite, magnesite, carnallite, polyhalite, natrolite and trona.

FEATURES AND ADVANTAGES OF THE INVENTION

A feature of this invention is that, although the magnesium cement can compete with and substitute for and replace Portland cement, nevertheless it is practicable to use machinery and kilns designed to produce Portland cement in the manufacturing and processing of the magnesium cement with greater fuel efficiency and very substantial savings in raw material and fuel or energy costs.

By using the magnesium cement produced by the process embodied in this invention, it is possible to produce concretes with conventional aggregates possessing compressive strengths of 160 mPa or 24000 psi. Also, whereas Portland cement requires curing for 28 days after mixing to achieve near maximum strength, magnesium cement can achieve strengths of 160 mPa within 24 hours of mixing.

A further feature of this invention is that concretes made by mixing blast furnace slags and by-products of smelting works and volcanic scorias and salt contaminated aggregates and clays, and similar fillers unacceptable to the manufacture of concrete from Portland cement, can be used with magnesium cement to produce concrete with compressive strengths as high as 160 mPa.

The magnesium cement also has the capacity to bond to wood and glass and mineral fibres, and to polymer materials and to glazed bricks and to colouring oxides, and can be sprayed or painted or plastered or trowelled or cast on a variety of construction materials, imparting strength, fire resistance, water resistance and pleasant appearance.

As an illustration of the versatility of the magnesium cement, if the cement is mixed with sawdust or waste wood, compression strengths in excess of 50 mPa can be achieved within 24 hours of mixing. Even if the amount of magnesium cement is only a small proportion of the mixture, (for example 10% by weight) the product will be light enough to float on water and still be able to withstand water penetration without excessive swelling or deterioration. The product also has a number of other advantages which are described hereunder in a preferred embodiment.

Another feature of the process is that such minerals often present in uneconomic concentrations or complex mixtures with no commercial value can be utilized and the valuable components contained used in the manufacture of the magnesium cement or the by-products of the process.

A further feature is that waste battery acids and calcium chloride solutions and other wastes of industry hitherto presenting disposal problems can be utilized in the process. Depending on the analysis of the brines and dolomites and other available raw materials, it may become desirable to prevent a continuing increase in the concentration of the various anions and cations in the system. A feature of this embodiment is that all those ions which are not recovered as valuable by-products are used as an ingredient in a valuable product, namely a new and valuable magnesium cement, in such a way that little or no excess ions result from the process, resulting in no problems of residues with attendant pollution and environmental problems.

Soluble chlorides are commonly present in large quantitites in brines as herein defined, and which in many chemical manufacturing industries and water treatment plants are regarded as undesirable end products which pose disposal problems and have detrimental environmental characteristics. In an embodiment of this invention however such chlorides are converted into and may be recovered as useful and desirable water insoluble cement materials or as valuable by-products in a process which does not create serious environmental problems.

The quantities of by-products and product obtained will vary with the concentration and analysis of the brines and carbonates employed, and also will be affected by the desirability or otherwise of producing by-product hydrochloric acid, which will depend on local markets. In many situations by-product hydrochloric acid can be used for such applications as leaching of ores for metal content, in which case after recovery of the metal the resulting waste solutions can be recycled using this process.

However, hydrochloric acid produced in this process can be used directly in the mixing of the magnesium cement with aggregates, fillers and water. The addition of hydrochloric acid reduces the time of setting, and produces an easily castable extremely strong acid resistant concrete.

Similarly in many chemical processes using brines as raw materials the disposal of the excess unwanted chlorides poses a dumping problem with associated environmental implications. In this process the unwanted chlorides are integrated into the valuable cement product.

Using this process, the by-products of the process are:

(1) High purity calcium sulphate (anhydrite) when operating temperatures are relatively high (summer production) with some admixed gypsum (calcium sulphate dihydrate) when operating temperatures are relatively low (winter production). This product is in demend for agricultural purposes as a fertilizer and soil conditioner, and also is required in substantial amounts for Portland cement and plaster of Paris in the building industries.

(2) Sodium chloride (common salt) used by industry for a variety of applications, very importantly as a raw material for the manufacture of caustic and washing sodas.

(3) Muriate or chloride of potassium, used extensively as a fertilizer, preferably in conjunction with gypsum and milk of magnesia.

(4) Milk of magnesia (magnesium hydroxide), used in agriculture and in the manufacture of pharmaceutical products.

(5) Calcined magnesia, or magnesium oxide, used in agriculture, magnesium oxychloride cements, and as a refractory material (usually after calcining to higher temperatures).

(6) Hydrochloric acid used extensively in industry and mineral extraction and treatment and as a raw material for the manufacture of chlorine compounds used in water treatment.

The principal product of the invention however is a new valuable efficient and economical cement product high in magnesium content possessing the capacity to bond with great tenacity and strength with simple addition of fresh or saline water a large range of like and unlike materials, including gravel, sand, volcanic scoria, clay, shale, saw-dust, chipwood, straw, soil and plastic. Without in any way limiting the application of this invention, this new cement may be used in the following typical applications:

(1) Construction of new concrete using sand and aggregate capable of achieving compressive strengths of 160 mPa.

(2) Construction of wood admixed concrete achieving compressive strengths of 50 mPa within 24 hours of mixing.

(3) Construction and manufacture of lightweight, fire resistant high strength building beams, blocks, bricks, particle boards, asbestos cement replacements, tiles, sleepers, plasters, stuccos, renders and paints.

BRIEF DESCRIPTION OF THE DRAWINGS

An embodiment, and examples, of the invention are described hereunder in some detail with reference to, and are illustrated in the accompanying drawings, in which:

FIG. 1 is a process chart showing a typical plant for the production of magnesium cement, and the aforesaid by-products, and FIG. 2 is a table showing how a variation of quantities of some components of a magnesium cement will effect variations of physical properties.

DETAILED DESCRIPTION OF THE PREFERRED EMBODIMENT

In describing the process, it will be convenient to refer to the accompanying diagram. It must be realised, however, that numerous apparati and techniques well known to chemical engineers may be used in addition to or in substitution for the vessels and processes referred to in this description.

The raw products for infeed contain metal chlorides, desirably including some magnesium chloride. They may also contain fluorides, phosphates and borates with beneficial results. They may consist of, or include: bitterns, ground waters, salt lake waters, evaporite minerals, sea water, saline water treatment plant rejects, and other analogous solutions.

The mineral infeeds include carbonates and silicates, and necessarily include some magnesium containing minerals. The following is a list of useful minerals:

| CARBONATES | SILICATES |
| --- | --- |
| Magnesite | Albite |
| Dolomite | Oligoclase |
| Trona | Labradorite |
| Hydromagnesite | Leucite |
| Marl | Nepheline Syenite |
| Natron | Sodalite |
| Siderite | Lazurite |
| Calcite | Hypersthene |
| Limestone | Biotite |
| | Hornblende |
| | Olivine |
| | Talc |
| | Meerschaum |
| | Scapolite |
| | Wollastonite |
| | Allophane |
| | Kaolin |
| | Axinite |
| | Zeolites |
| | Blast Furnace Slags |
| | Analcite |
| | Natrolite |
| | Apophyllite |
| | Chabazite |
| | Prehnite |
| | Thomsonite |
| | Heulandite |
| | Stilbite |
| | Phillipsite |

| CARBONATES | SILICATES |
|---|---|
| | Harmotome |
| | Pectolite |
| | Laumontite |
| | Pyrope |
| | Bentonite |
| | Serpentine |

Kilns 7 and 10 (which may be constituted by different parts of a simple kiln) are rotary kilns which normally operate in the range of 600° C. to 900° C., although they can operate as low as 300° C. They are normally gas or oil fired, but could be fluidized bed type kilns, infra-red kilns, or electric kilns.

The infeed or carbonates and silicates (including some magnesium containing minerals) to the kilns is normally about 1cm particle size crushed mineral, and below. However, if brines from settling tank 2 are introduced, finely powdered infeed material will be more absorbent, and will tend to agglomerate into larger particles in kiln 10. Dust suppresion data will after determine the plant layout and the crushing or grinding parameters.

The kilns are fitted with dust collection mechanisms, which include a wet scrubber, which yields some hydrochloric acid, which in turn can be fed into a concrete tank containing dolomite, magnesite or lime or other carboante material, to yield some magnesium chloride and some calcium chloride. This is not shown.

Blender 14 is a simple drum type blender (or a rotary mixer), which mixes the outputs of the two kilns. It should be used in conjunction with a roll type grinder or other device to ensure there are no lumps or large particles.

The small low temperature kiln 15 operates in the range of 300° C. to 900° C., for the production of caustic magnesium. The small high temperature kiln 16 operates in the range of from 1400° C. to 1600° C. for the production of refractory magnesia. Both kilns are of a type in common use, and can be rotary or other kilns, fluidized bed kilns, or electric furnaces.

The bitterns and brines normally contain sulphates, and for this process and for best results, sulphates should be removed by adding calcium chloride in solution to the bitterns in settling tank 1 so that the contained calcium content is equivalent to 1.25 times the sulphur content present as sulphate in the bitterns. The calcium chloride solution required for this sulphate removal may be conveniently obtained by reacting carbonate mineral into the Neutralizing Stockpile 9, through the Settling Tank 12 (described hereunder). Neutralising Stockpile 9 is a stockpile of carbonate infeeds which include calcium carbonate, reacted upon by the residue liquor from an absorption tower 8 wherein water absorbs HCl gas for the production of hydrochloric acid. Useful quantitities of calcium chloride solutions are thereby formed. Suitable carbonate minerals for this process are limestones, dolomite, magnesites, marls, sea shells and calcareous sands, and alternative materials, which can be used according to availability are flue dusts from Portland cement kilns, carbide lime from acetylene manufacture, and the waste calcium chloride liquors and precipitated chalks and backstones discharged as waste products from factories engaged in the production of washing soda. Minerals containing additional magnesium, sodium or potassium including epsomites, tronas, alunites and evaporite minerals generally may also be utilized, however it should be noted that the total calcium introduced at this stage should be in balance with the total sulphates introduced from bitterns or these other sources. In the ideal situation the removal of sulphate is at a maximum and the loss of magnesium at a minimum if the pH of the bitterns in settling tank 1 is maintained in the range 7.0 to 7.8.

The calcium chlorides from the sources listed above are reacted with the bitterns in Reaction Tank 1, leading to the formation of magnesium chloride solution and calcium sulphate as anhydrite or gypsum, dependant on temperatures and dilutions. The calcium sulphate will normally form a solid crystalline sludge in the bottom Reaction Tank 1, whence it may be periodically removed, or alternatively the solutions in Reaction Tank 1 may be pumped to Settling Tank 2 from which the calcium sulphate may be continuously or periodically removed by mechanical means.

The mineral carbonates and/or silicates in crushed form are fed, together with some of the magnesium rich liquor from Settling Tank 2, into kiln 10, and heated to between 360° C. and 900° C. (but not more than 1000° C.) for a period of time.

The magnesium chloride has great affinity for water and forms a molten hydrate which remains stable until reaches temperatures in the range 200° C. to 300° C. Both kilns 7 and 10 are operated at temperatures above 360° C. The hot magnesium chloride hydrate attacks carbonate minerals and silicate minerals which are normally attacked by hydrochloric acid, releasing silicic acid and carbonic acid in the process, and being converted to magnesium oxide. The chloride released continues to attack fresh carbonate minerals to produce additional chlorides of calcium and magnesium and sometimes sodium and potassium.

Sodium chloride is a common constituent of brines and bitterns, and melts at 800° C. However, some magnesium oxide will react with sodium chloride to produce sodium hydroxide, which melts at 322° C. Similarly potassium chloride melts at 770° C., and in practice some potassium hydroxide melting at 360° C. will also be formed in portions of the kiln. Various eutectic compounds of still lower melting points will also frequently be formed, and the presence of borates and fluorides can further reduce melting points. The output from kiln 10 will therefore contain small quantities of soluble alkali silicate and carbonate materials, and possibly soluble borates, phosphates and fluorides, as well as magnesium oxide, unchanged silicate minerals, and some unchanged carbonate minerals, and possibly some calcium oxide and chloride.

The reactions described above will take place at temperatures considerably lower than 800° C., and in practice, kiln temperatures can be controlled to obtain desired characteristics in the cement product.

If carbonate minerals rich in calcium, e.g. limestone, are fed to kiln 10, some of the output of kiln 10 will be calcium oxide, particularly if the kiln temperature is sufficiently high. This calcium oxide is undesirable in the cement product, and therefore output of kiln 10 high in calcium oxide should be passed to Reaction Tank 3.

Calcium oxide will be converted to calcium chloride, and the concentration of calcium chloride may rise to high levels. It will then be desirable to periodically or continuously pump clear solutions from Settling Pond 4 to Reaction Tank 1 to allow excess calcium in solution as chloride to be reduced to desirable limits, and the recycling of these solutions may be continued until they approach saturation with respect to sodium and potassium chloride, at which stage, after removal of sulphate and calcium content, as described herebefore, and removal of magnesium, as described hereunder, they are pumped to Day Evaporation Pan 5 for subsequent production of relatively pure sodium and potassium chlorides, as described hereunder.

The magnesium rich solutions, free of calcium and sulphate deposited as calcium sulphate in Settling Tank 2 are pumped to Reaction Tank 3, where they come in contact with portion of the output of kiln 7 and kiln 10, slurried with water. If the carbonates contain calcium compounds in significant quantities, and the kiln 10 is operated at a low temperature (to save fuel costs), the output of kiln 10 will contain significant amounts of calcium carbonate ($CaCO_3$). While small quantities in the final product are beneficial in raising the pH, thereby reducing likelihood of corroding steel which may be encased in the cement, larger quantities merely act as a diluent for the cement and are therefore undesirable.

The outputs from kiln 7 and kiln 10 will differ in chemical composition according to the input of raw materials and operating temperatures. If output from kiln 10 is high in caustic lime, the entire output should be treated in Reaction Tank 3 to remove all caustic lime. If carbonates fed to kiln 10 are high in magnesium content, and sufficient magnesium rich brines from Settling Tank 2 are also fed to kiln 10, then the output of kiln 10 will contain no caustic lime, and may be used as a cement or as a component of a blended cement.

Outputs from either kiln 7 or kiln 10 may be fed back to Reaction Tank 3. In each case the addition of these slurried kiln products leads to the formation of complex chlor-oxy-hydroxy magnesium compounds of indefinite composition which form rapidly and settle quickly and to the co-precipitation of magnesium hydroxide as a fine suspension. The proportion of magnesium hydroxide can be increased by dilution or diminished by using more concentrated brines. The entire magnesium content of the brines will be removed from solution as either hydroxide or complex chlor-oxy-hydroxy magnesium compounds, and the magnesium content of the kiln output will also be recovered at this stage. Small additions of kiln output will result in significantly larger weights of magnesium compounds being precipitated.

Since the products of both kilns are anhydrous, and reactions take place at elevated temperatures, all the compounds discharged from the kilns are markedly different from any Sorel cement.

It will be observed that the denser product which forms most rapidly in higher concentrations of brines or bitterns contains significant chloride, and this product can be conveniently separated by crude mechanical means as a hard mass in Settling Pond 4 prior to feeding to kiln 7. At the same time magnesium hydroxide of high purity and fine particle size can be more conveniently separated by vacuum filtration or centrifuge techniques, from the milky suspension which forms at the same time, preferably following flocculation using readily available flocculants.

Magnesium hydroxide separated in this way can be sold after washing and drying as high grade milk of magnesia, or if preferred fed into kiln 7 for the production of high grade kiln products as described hereunder.

The clear liquid remaining after settling or filtration of magnesium hydroxide will be free of magnesium and sulphate ions. Periodic recycling of this liquid to Reaction Tank 1 will ensure freedom from calcium concentrations. By pumping to Day Evaporation Tank 5, and allowing evaporation to proceed with slight increases in temperature, sodium chloride of high purity will crystallize out. This process may conveniently be achieved by using solar evaporation. At the same time potassium chloride concentration will increase, and when this concentration approaches saturation point, reduction of the temperature of the liquid will result in crystallization of very pure potassium chloride in Night Cooling Tank 6. This process may conveniently be effected by pumping the warmer nearly saturated solution from Day Evaporation Tank 5 to Night Cooling Tank 6, and subsequent daily cycling of solution, allowing day and night harvesting of the two pure salts to proceed on a continuous basis.

As described beforehand and hereunder, the process allows solids of varying purity and content of magnesium hydroxide and complex chlor-oxy-hydroxy magnesium compounds to collect in Settling Pond 4. The chlor-oxy-hydroxy magnesium compounds collected in Settling Pond 4 are also dissimilar from Sorel cement, in that the ratio of magnesium to chlorine by weight always exceeds 2.5, whereas in Sorel cement the ratio lies between 0.6 and 2. In addition Sorel cement will not form in dilute solutions and in the presence of calcium hydroxide.

These solids are passed through kiln 7. By operating this kiln in the vicinity of 350° C., the solids are dehydrated, with evolution of water, to form a magnesium cement of quick setting characteristics and moderate strength. By operating kiln 7 at higher temperatures, stronger cements of slower setting characteristics are formed, with the evolution of hydrogen chloride fumes. These may be collected by solution or "scrubbing" in brines or water in Absorption Tower 8, together with flue gases from kiln 10, and percolated over the carbonates in Neutralizing Stockpile 9.

In practice it will be found convenient to almost completely fill Absorption Tower 8 with carbonates. The neutralized hydrogen chloride containing dissolved calcium and magnesium chlorides (and possibly sodium and potassium chlorides) after settling of suspended clays in Settling Tank 12, is fed back to Reaction Tank 1, thereby providing an additional source of calcium to precipitate sulphate, magnesium to produce additional magnesium cement, and sodium and potassium to produce additional by-products.

The carbonates used to neutralize the hydrogen chloride from kiln 7 and cement kiln 10 may be obtained from any convenient source, and include dolomite, magnesite, limestone, marl, trona and natron. According to local availabilities, kiln dust from Portland cement manufacture, precipitated chalk, backstone and grit from alkali plants, as well as by-product carbide lime can be utilized.

If the calcium content of available carbonates is higher than required to precipitate the sulphate content of the bitterns or brines used in the process, it may be convenient to utilize the cement processing plant to salvage waste industrial acids, steel pickling solutions, reclaimed battery acids, and acids from scrubbed industrial or smelting activities to minimize pollution problems, enhance air purity and reduce disposal and treatment costs.

If the magnesium content of the available carbonates is high, as will occur if dolomite or magnesite is used to neutralize kiln gases, substantial increases in the quantity of soluble magnesium salts will be available for manufacture of magnesium cement. This factor will allow virtually unlimited quantities of magnesium cement to be produced in any one location provided adequate reserves of either magnesium carbonate minerals (dolomite, marls or magnesites) or magnesium rich brines are available.

In practice, therefore, there will always be a large surplus of magnesium containing solutions from Settling Pond 4 available for mixing with carbonates and silicates to form the input to kiln 10.

The solid feed for kiln 10 is a mixture of carbonates (dolomite, magnesites and marls) and silicate minerals (talc, kaolin, shales, asbestos, chrysotile, phlogopite, olivine and serpentine, etc.) in various proportions.

The ratio can best be determined having regard to the magnesium content of the components, and for maximum strength in magnesium cement product, the magnesium content of the mixed feed should be at least ten per cent. Sufficient liquid from Settling Tank 2 should be added to the mixed solid feed to kiln 10 to ensure that the slurry feed to kiln 10 contains at least 5% and preferably 10% of magnesium chloride calculated on an anhydrous basis.

The input to kiln 10 consisting of carbonates, silicate minerals and magnesium rich brines from Settling Tank 3 should for best results be intimately ground using similar procedures to those used in the wet process Portland cement industry.

Without inclusion of magnesium rich brines, the carbonates fed to kiln 10 do not break down until relatively high temperatures are reached, approximately 900 degrees C for pre-Cambrian dolomites and magnesites, and approximately 650 degrees C. for Quaternary or recent dolomites. The inclusion of the magnesia rich brines lowers these temperatures dramatically, because at relatively low temperatures (300 degrees C.) soft dolomites and magnesites are attacked by the chloride from the decomposition of molten magnesium chloride hydrate and other metal chlorides present.

Very importantly, the magnesium chloride content of the brines prevents any formation of basic or alkaline calcium compounds (oxides or hydroxides) by converting calcim oxide to calcium chloride at the same time forming magnesium oxide or hydroxide or chlor-oxy-hydroxy magnesium compounds. It will be observed that the presence of calcium oxide or hydroxide in the magnesium cement has very serious effects on the strength of the cement, whereas the presence of calcium chloride in the magnesium cement has little effect on the strength of the cement. No calcium hydroxide or oxide can form in the presence of a surplus of magnesium chloride.

The silicate minerals impart impact strength to the magnesium cement, and at higher concentrations allow the cement to be drilled and worked in a fashion similar to meerschaum. The silicate minerals also react with any loosely held chloride in the mixed cement to form silicic acid thereby improving the strength and permanency of product made from magnesium cement. Small additions of phosphate and fluoride minerals to kiln 10 will also react with free chloride or hydroxy groups to form stronger and more permanent cements.

From time to time it will be found desirable to increase both the calcium oxide and magnesium oxide content of the kiln outputs fed to Reaction Tank 3, and for reasons of economy it will be preferable to feed the output of cement kiln 10. On these occasions it will be found preferably to feed dolomite or magnesite to cement kiln 10 which is heated to higher temperatures in excess of 900 degrees C to convert all the calcium and magnesium carbonate content to the reactive oxides. By using soft recent dolomites, and by the addition of magnesium rich brines, the use of this relatively high temperature may be avoided. Alternatively, waste lime products, e.g. carbide lime from acetylene manufacture may be substituted for calcined dolomite or magnesite at this stage.

On occasions, if kiln temperatures in kiln 7 and 10 are allowed to rise to the point where excessive hydrogen chloride is evolved, the resulting cements may become too alkaline in reaction and setting times of the resulting cement may be too slow. In such cases very strong cements of quick setting characteristics may be obtained by adding solutions of the hydrogen chloride gas evolved and scrubbed in the Absorption Tower 8 in the mixing of the cement, or alternatively by adding brines or bitterns to the magnesium cement in the mixing The outputs of kiln 7 and cement kiln 10 may be blended in various proportions to produce cements of different characteristics. In practice most efficient operation will be achieved if the total production from each kiln is blended, and the relative amounts of brines and magnesium and silicate minerals adjusted to give desired characteristics in the final cement.

Some brines are composed almost entirely of sodium chloride, and in such cases setting time of cement product may be slow, particularly in cold weather. In such cases small quantitites of epsomite or kieserite (2-5%) may be added to the input of kilns 7 and 10, or alternatively blended into the kiln output prior to grinding. Blended cement manufactured in accordance with the foregoing details will last for long periods in storage without deterioration.

In practice, iln 10 may be used on an intermittent basis to perform the role of kiln 7, and vice versa. Variations in desired operating temperatures of kiln 10 will occur according to the particle size, density, hardness and reactivity of the carbonates and silicates used. High temperatures will cause rapid loss of hydrogen chloride, and the conversion of calcium carbonate to calcium oxide. If product rich in calcium oxide is fed back to Reaction Tank 3, and converted to calcium chloride, no harm results. If however, product rich in calcium oxide is blended in the magnesium cement, the strength of concretes made with the cement will be reduced. Low temperatures in kiln 10 will result in high levels of unreacted magnesium carbonate and very low levels of reacted silicate minerals appearing in the kiln output, with loss in cement strength.

Intermediate temperatures in kiln 10 will allow maximum production of reactive magnesia and agglomeration of particles into dense nuclei to form strong cements. At the same time the small amount of calcium oxide formed (which might otherwise reduce the strength of the magnesium cement) is converted to harmless and stable calcium chloride.

The output of the two kilns may be mixed, and used in any proportions to obtain desired characteristics. The magnesium cement may be substituted for normal Portland cement and mixed with clean sand and gravel to produce very strong concrete, or used in lesser proportions to produce a concrete of equal strength to normal concrete.

However, a very important feature of the magnesium cement is the capacity to form strong chemical bonding with magnesium minerals, and very strong concretes resembling natural stone in appearance may be made using clays, talcs, kaolins, slags and smelts from blast furnace and smelting operations, to replace and substitute for the conventional agregates normally used in concrete construction.

The following are specific examples of the invention:

EXAMPLE I

Lacustrine dolomite, containing calcium and magnesium carbonates of the following analysis, on the dry sample:
calcium carbonate: 51%
naturally associated magnesium carbonate: 41%
clay minerals: 6%
sodium carbonate: 0.5%
sodium chloride: 1.0%
was crushed and mixed with bitterns of specific gravity 1.31 in the ratios of 100 parts of dolomite to 25 parts of bitterns by weight.

The resulting paste was calcined in a kiln (kiln 10) at temperatures reaching 650° C. with a retention time in the kiln of three hours. Earthy and sweet smelling carbon dioxide was evolved, and a hard mass was formed. This mass was coarsely ground, and mixed with water in the ratio 5:1. The resulting paste commenced hardening after approximately one hour, and after 24 hours became a hard mass. Discs of cement made in this fashion were tested by a drop-weight mechanism and were found to possess an impact strength equivalent to 15 mPa cncrete. The hard mass was analysed for magnesium and chlorine. After allowance for chlorine as calcium, sodium and potassium chlorides, the magnesium/chlorine ratio in the final product was found to be 3.6.

EXAMPLE II

Brines from the salt recovery operations of I.C.I. at Dry Creek in South Australia, having a specific gravity 1.285, were treated with waste calcium chloride from the caustic soda plant of I.C.I. at Osborne, in that state, in calculated quantities needed to precipitate all the sulphate present in the brines. The resulting fine microcrystalline deposite of gypsum was allowed to settle, and the gypsum was subsequently recovered from the bottom of the reaction tank. The brines now almost free of calcium and sulphur and with a pH of 7.1 were then mixed into a thin slurry with high purity Mt. Gambier dolomite containing 55% calcium carbonate and 43% magnesium carbonate calcined to 950° C. in kiln 10 with a retention time of three hours. The addition of calcined dolomite was stopped when the magnesium level in the filtered brine had dropped to less than 0.1%. The semi hard precipitate which formed rapidly in the slurry heated by the reaction was allowed to settle, however, the brines above the solid remained milky in appearance. These brines were filtered through a vacuum filter, and the suspended material washed and analysed. The suspended material when dried was found to consist of magnesium hydroxide 98.5% purity.

The magnesium hydroxide was then calcined at 800° C. and found to produce a high grade caustic magnesia and was further calcined to 1500° C. and found to produce a high grade dead burnt magnesia.

The brines after filtering above were then analysed and found to contain significant calcium chloride as well as potassium and sodium chloride. The above steps were repeated, excepting that the temperature in kiln 10 was lowered to 750° C. Under these conditions the calcium chloride level in the brines dropped to levels below 1%. It was then found that the filtered brines contained insignificant calcium and magnesium levels, and by allowing the filtered brines to evaporate during warm days, high grade sodium chloride crystallized out, and by washing with concentrated sodium chloride solution, could be recovered free of any contaminating potassium or sodium bromides.

The remnant brines still containing potassium chloride and significant sodium chloride were then cooled, simulating night time cooling conditions. Evaporation at lower temperatures was also accelerated by the use of a vacuum pump to effect simultaneous water removal and cooling. Under these conditions in both cases crystals of potassium chloride formed quickly, and after washing with concentrated potassium chloride solution to remove traces of bromine and sodium, were found to be well above standard industrial specifications for fertilizer muriate of potash. Remnant brines and washings were again recycled to the day evaporation pans and the process repeated.

It was also found that calcium chloride levels in the brines could be removed by treating mineral alunite containing potassium aluminium sulphate from the Coober Pedy opal fields with waste industrial hyrochloric and sulphuric acids to remove both calcium and sulphur from the brines and at the same time produce additional valuable potash fertilizer.

The semi hard material formed by the reaction of the calcining in kiln 10 of the Mt. Gambier dolomite with treated salt-field brines was found to gradualy harden. Before full hardening had developed, this product was fed into kiln 7 operating at 500°-550° C., still contaminated with remnant brines. during a retention time in the kiln of one hour, some hydrogen chloride was found to form, and the material first hardened and then disintegrated to a fine powder. This powder was then mixed with water, and after a period of several hours, was found to set to a very hard cement. The cement was analysed, and after adjustment for the chlorine content arising from retained unreacted brines, was found to exhibit a ratio Mg/Cl of 4:1. The resistance of the cement to impact was determined by a laboratory drop weight mechanism, and was found to be equivalent in impact strength to 80 mPa concrete made from Portland cement.

EXAMPLE III

Commercial grade powdery magnesite of purity 82% from near Copley in the Flinders Ranges in South Australia was analysed and found to contain 12% limestone and 5% clay minerals. This mineral was moistened with 15% of bitterns containing 11% magnesium and calcined in kiln 10 to temperatures in the range 500° C. to 650° C. with a three hour retention time. The dry kiln output was found to contain no free calcium oxide, and less than 5% unchanged magnesium carbonate. Anhydrous calcium chloride was present in the dry kiln output evenly disseminated throughout the powder. 10% by weight of the kiln output was accumulated in Reaction Tank 3, and 90% was retained for subsequent blending. Salt water and a crude mineral epsomite obtained from surface deposits in the north of South Australia were also added to Tank 3. The epsomite contained 20-25% of absorptive clay minerals referred to locally as "bulldog shale". The calcined magnesite hardened, and was crudely separated from the remnant salt water prior to calcining in kiln 7 at temperatures in the range 500°-550° C. with a retention time of two hours. The resulting powder material was mixed with the 90% of retained kiln 10 output, and the mixed cements moistened with salt water. Mixtures of gravel, sand and mixed cement in the ratios 4:2:1 were allowed to harden, and subject to compression strength tests after 7 days and 60 days. The strengths in each case exceeded 150 mPa, however, accurate testing of the cements was impractical due to the capacity of the clay minerals to absorb stresses without the mass of concrete collapsing.

Hardened cements made by replicating these procedures were further heated. At temperatures in the range 500°-600° C., some change in colour was observed, however, the mass remained mechanically strong. At temperatures exceeding 1000° C. and approximating 1050° C. deterioratin of mechanical strength and release of acrid fumes was observed. When the cements were removed from the kiln, finly ground and moistened with both fresh and saline waters, the mass again became hard, although strength as determined by laboratory drop ball techniques was not as great as the original blended cement.

Further quantitites of the blended cement manufactured as above were mixed in varying proportions with gravels, sands, clays, wood chips, plastic beads, sawdust, volcanic scorias, expanded vermiculite blast furnace slags, rice husks, sugar cane residues and polymer fibres, and a whole range of useful and decorative materials obtained. Further quantitites of the blended cement were mixed with finely ground silica and clay fillers, and applied as paints, sprays and adhesives to a variety of materials including wood, stone, ceramic concrete and bitumen surfaces with obvious success.

The cement product from kiln 10 was found on analysis to possess a magnesium to chlorine ratio of 4.6, and the cement product from kiln 7 was found on analysis to possess a magnesium chlorine ratio of 4.4. The mixture of the two kilns when blended in the ratio 2:1 was found to have a ratio 4.45.

EXAMPLE IV

High grade magnesite (96% $MgCO_3$) obtained from near Cloncurry in Queensland was broken by impact crusher into lumps averaging 12.5 mms. in diameter and calcined to a temperature of 900° C. in kiln 10 with a retention time in the kiln of two hours.

The lumps emerged from the kiln as porous but unbroken. One half of the kiln output was easily ground in a rolls mill to 100 BSS mesh or finer, whilst the other half was returned to Reaction Tank 3 and immersed in brines obtained by the evaporation of sea water to a specific gravity of 1.32. The lumps hardened and swelled with the formation of chlor-oxy-hydroxy compounds, and were transferred to Settling Pond 4 and allowed to drain. The hardened lumps were then calcined in kiln 7 to a temperature of 450° C. with a retention time in the kiln of 30 minutes. The product was allowed to cool, and then ground in roller mills to pass 100 BSS mesh. The two portions were then recombined and mixed in a ribbon blender.

The resulting blended cement was mixed in the proportions 1:6 by weight of waste blast furnace slag from the lead smelting works of Broken Hill Associated Smelters at Port Pirie, South Australia, to obtain a concrete which, after three days at ambient temperatures averaging 20° C. was tested and found to possess a compressive strength of 165 mPa. The blended cement was analysed and the ratio by weight of Mg:Cl determined and found to be 6.7.

EXAMPLE V

Brines with a specific gravity of 1.30 obtained by the evaporation of sea water were accumulated in Settling Tank 2. Nine tenths of these brines were then pumped to Reaction Tank 3, and one tenth were mixed with naturally occurring fine quaternary dolomite obtained from Yorke Peninsula in South Australia in the ratio 1:10 by weight. The moistened dolomite was then calcined in kiln 10 attaining a maximum temperature of 550° C. which was maintained for two hours. The entire output of kiln 10 was then returned to Reaction Tank 3 and mixed with brines remaining. Complex chlor-oxy-hydroxy compounds were formed and allowed to settle in Settling Pond 4. The clear brines were pumped to Day Evaporation Pan 5 and sodium chloride and potassium chloride recovered using the method outline in Example II.

The complex chlor-oxy-hydroxy compounds were then calcined in kiln 7 to temperatures of 400° C. with a retention time of one hour. The kiln output was found to set to a hard cement when mixed with water. Portion of the kiln output was then returned to Reaction Tank 3 and mixed with fresh brines, in the ratio 1 ton of kiln output to 6 tons of brines. The resulting formation of further chlor-oxy-hydroxy compounds resulted in a dry weight gain of 1.7 times on each passage through kiln 7. This procedure was repeated several times, with no further input from kiln 10, the only additional material required being fresh brines of specific gravity 1.30 and a source of heat.

On each repetition of the process portion of the output of kiln 7 was mixed with clay in the ratios 1:4, and water added to form a stiff paste. The paste dried to a hard mass within 12 hours. It was found that the strength of the hard mass produced in this manner increased during each passage of the cement product through the cycle to a maximum of 85 mPa. The chlorine magnesium ratio of the cement was found to very with the retention time in the kiln and the temperature of the kiln, reaching a minimum of 3.6 at temperatures of 360° C. and a ratio of 7.5 at temperatures in excess of 500° C.

It will also be observed that magnesium cement will show great cohesion for wood, glass, paper, sand, clay, sawdust, straw, rice husks, polymer fibres, wood fibres, metal and ceramic products, enabling the cement to be used in a multitude of applications mixed with or in contact with these materials.

Magnesium cement can also be used in contact with steel reinforcements, however corrosion will still occur in those situations where metal is exposed to the air. In such cases exposed metal reinforcement should be carefully covered with magensium cement. Care should also be taken to ensure that sufficient of the output from kiln 10 is used to maintain levels of alkaline carbonates and silicates (or phosphates or borates) to prevent corrosion of metal occurring.

Deterioration of mineral fibre or glass wool reinforcement can occur with normal Portland cement due to the presence of excess calcium oxide or hydroxide. such deterioration will not normally occur with magnesium cement because the process outlined herein will convert strongly alkaline calcium compounds to neutral forms. Magnesium cement is compatible with nylon, carbon, polypropylene, glass, wood and polymer fibres used to impart tensil strength to concrete.

Concretes made with magnesium cement will be found to be superior in acid environments, and in situations where the cement is exposed to industrial pollution, acid rain, lactic acid in dairy floors, and corrosive brines. Concretes made with magnesium cement will exhibit flexible and readily acceptable rates of expansion and contraction on heating and cooling. Heating to high temperatures above 400° C. will allow some decomposition to proceed, with the evolution of hydrogen chloride and some loss of strength. The cement will retain moderate strength until temperatures of 1000° C. are reached. In such cases after restoring to normal temperatures the addition of hydrochloric acid or brines containing magnesium chloride to the weakened cement will allow the hardening of the cement to form a hard mass to proceed as before.

I claim:

1. A cement product which requires only the addition of water to produce a cement, in which the cement product is composed of two basic cementing ingredients, one ingredient consisting essentially of a material selected from the group consisting of a mixture of dried and calcined magnesium sulphate, calcium chloride, sodium chloride, and anhydrous magnesium oxychloride, and a combination of said mixture with one or more other halides and salts of alkalis and alkali earth elements, which are in general, neutral to mildly acid in reaction, the other ingredient consisting essentially of a material selected from the group consisting of carbonates, and a mixture of carbonates and a member selected from the group consisting of bicarbonates, borates, phosphates, silicates, and alumino silicates, all of the foregoing of alkalis and alkali earth elements which are, in general, neutral to mildly alkaline in reaction, the two basic ingredients in each case containing substantial amounts of magnesium oxide and being finely ground and intimately mixed.

2. A method for producing a product which, when mixed with water, sets to a magnesium cement, and which is a reaction product of metal chloride with a material selected from the group consisting of magensium carbonate, magnesium silicate and mixtures, and represented by the general formula MgO-MCl, where M is a metal, said method comprising reacting a metal chloride and water with a magnesium containing substance which includes a material selected from the group consisting of magnesium carbonate, magnesium silicate and mixtures, in a kiln space at a temperature between 300° C. and 1000° C. to release hydrogen chloride, and thereby in turn produce reactive magnesium oxide in combination with other compounds of magnesium and said metal.

3. A method according to claim 2 wherein said magnesium containing substance includes at least one of:

| CARBONATES | SILICATES |
| --- | --- |
| Magnesite | Albite |
| Dolomite | Oligoclase |
| Trona | Labradorite |
| Hydromagnesite | Leucite |
| Marl | Nepheline Syenite |
| Natron | Sodalite |
| Siderite | Lazurite |

-continued

| CARBONATES | SILICATES |
| --- | --- |
| Calcite | Hypersthene |
| Limestone | Biotite |
| | Hornblende |
| | Olivine |
| | Talc |
| | Meeschaum |
| | Scapolite |
| | Wollastonite |
| | Allophane |
| | Kaolin |
| | Axinite |
| | Blast Furnace Slags |
| | Analcite |
| | Natrolite |
| | Apophyllite |
| | Chabazite |
| | Prehnite |
| | Thomsonite |
| | Heulandite |
| | Stilbite |
| | Phillipsite |
| | Harmotome |
| | Pectolite |
| | Laumontite |
| | Pyrope |
| | Bentonite |
| | Serpentine. |

4. A method according to claim 2 comprising extracting HCl gas from the flue gases of at least one said kiln, and absorbing the HCl gas in water to thereby form hydrochloric acid.

5. A method according to claim 2 comprising establishing a stockpile with metal carbonates, extracting flue gases from at least one said kiln, absorbing an HCl gas component of the flue gases into water in an absorption device, and reacting said aqueous hydrochloric acid so formed with the metal carbonates to form metal chloride in said stockpile.

6. A method according to claim 5 further comprising reacting waste acids with the metal carbonates to form metal salts thereof.

7. A method according to claim 2 wherein some of said magnesium oxide in combination with said other compounds is heated in a further kiln space to a temperature exceeding 300° C. to at least partially convert same to magnesium chloride compounds by decomposition in the presence of further hydrochloric acid and release by that decomposition of hydrated magnesium chloride or chlor-oxy-hydroxy compounds.

8. A method for producing a product which, when mixed with water, sets to a magnesium cement, and which is a reaction product of metal chloride with a material selected from the group consisting of magnesium carbonate, magnesium silicate and mixtures, and represented by the general formula MgO-MCl, where M is a metal, said method comprising reacting brines with calcium chloride and removing sulphates contained in the brines as gypsum and anhydrite, crushing materials which include at least one material selected from the group consisting of magnesium carbonate, magnesium silicate and mixtures, and mixing with some but not all of the sulphate free brines, and calcining in a kiln at a temperature exceeding 300° C. to release hydrogen chloride and thereby in turn produce a first anhydrous product containing reactive magnesium oxide in combination with other compounds, feeding back at least some of said calcined product to a reaction tank and reacting it with the remainder of the sulphate free brines to form chlor-oxy-hydroxy compounds of magnesium wherein the ratio of magnesium to the chloride radical exceeds 3.6, separating the said chlor-oxy-hydroxy compounds from residual liquir and calcining in a kiln at a temperature between 300° C. and 1000° C. to release hydrogen chloride and thereby in turn produce a second anhydrous calcined product containing reactive magnesium oxide in combination with other compounds of magnesium and said metal, and blending said calcined products together.

9. A method according to claim 8 further comprising separating magnesium hydroxide from said residual liquor.

10. A method according to claim 9 further comprising calcining said magnesium hydroxide in a kiln at between 300° C. and 900° C. and thereby producing caustic magnesium oxide.

11. A method according to claim 9 further comprising calcining said magnesium hydroxide in a kiln at between 1400° C. and 1600° C. and thereby producing refractory magnesium oxide.

12. A method according to claim 8 further comprising separating sodium chloride from said residual liquor by evaporation of water therefrom.

13. A method according to claim 8 further comprising separating potassium chloride from said residual liquor by cooling and crystallization of dissolved potassium chloride.

14. A method according to claim 8 wherein said minerals include calcium carbonates.

15. A method according to claim 8 further comprising reacting brines with said calcined reactive magnesium oxide in combination with other compounds, when said other compounds include calcium oxide, so as to convert such calcium oxide to calcium chloride and other salts.

16. A method according to claim 8 wherein said silicates include alumino silicate minerals.

17. A method according to claim 8 wherein said kilns are separate kilns, and further comprising producing said reactive magnesium oxide and said other compounds in different particle sizes from said kilns.

18. A method according to claim 8 further comprising adjusting the pH of the product by selecting raw materials and controlling infeed thereof to said kilns to include minerals which are alkaline.

* * * * *